(12) United States Patent
Beghelli

(10) Patent No.: US 7,777,448 B2
(45) Date of Patent: Aug. 17, 2010

(54) BATTERY-RECHARGING DEVICE

(75) Inventor: Gian Pietro Beghelli, Monteveglio-Bologna (IT)

(73) Assignee: Beghelli S.p.A., Monteveglio-Bologna (IT)

( * ) Notice: Subject to any disclaimer, the term of this patent is extended or adjusted under 35 U.S.C. 154(b) by 84 days.

(21) Appl. No.: 10/591,981

(22) PCT Filed: Mar. 7, 2005

(86) PCT No.: PCT/EP2005/002468

§ 371 (c)(1),
(2), (4) Date: Jan. 12, 2007

(87) PCT Pub. No.: WO2005/086313

PCT Pub. Date: Sep. 15, 2005

(65) Prior Publication Data

US 2007/0273330 A1    Nov. 29, 2007

(30) Foreign Application Priority Data

Mar. 8, 2004 (IT) ............................ VI2004A0040
Jul. 19, 2004 (IT) ............................ VI2004A0177
Dec. 23, 2004 (IT) ............................ VI2004A0300

(51) Int. Cl.
*H02J 7/00* (2006.01)

(52) U.S. Cl. ...................... 320/113; 320/112; 320/114

(58) Field of Classification Search ......... 320/112–114, 320/109
See application file for complete search history.

(56) References Cited

U.S. PATENT DOCUMENTS

| 3,653,540 | A | * | 4/1972 | Offutt | 221/75 |
| 4,602,203 | A | * | 7/1986 | Bragdon | 320/155 |
| 5,157,318 | A | * | 10/1992 | Wang | 320/110 |
| 5,544,784 | A | * | 8/1996 | Malaspina | 221/135 |
| 5,744,933 | A | * | 4/1998 | Inoue et al. | 320/110 |
| 6,262,559 | B1 | * | 7/2001 | Eggert et al. | 320/103 |
| 6,396,242 | B2 | * | 5/2002 | Choi et al. | 320/113 |
| 6,683,438 | B2 | * | 1/2004 | Park et al. | 320/108 |
| 7,211,986 | B1 | * | 5/2007 | Flowerdew | 320/108 |

FOREIGN PATENT DOCUMENTS

EP    0 693 813 A    1/1996

OTHER PUBLICATIONS

International Search Report, Sep. 23, 2005.

* cited by examiner

Primary Examiner—Edward Tso
Assistant Examiner—Samuel Berhanu
(74) Attorney, Agent, or Firm—Hedman & Costigan, P.C.; James V. Costigan

(57) ABSTRACT

A battery-recharging device (6), which can also be used to hold a pack of batteries (5) which may be blister-packaged, for display at the point of sale. The battery-recharging device has a support (1, 17, 51), which includes a series of housings (2, 18) for the connection and linking of packs of batteries (5); a pair of terminals (7, 8, 80), which are electrically connected with the poles (21) of each battery (6) contained in the battery packs (5) and are accessible from the outside, in order to obtain electric connections with the charging and/or maintenance circuits of a battery charger, which is incorporated in the device.

15 Claims, 15 Drawing Sheets

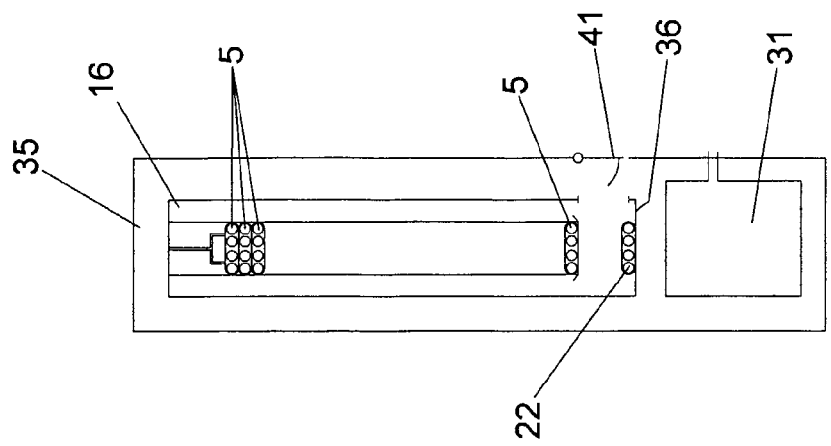
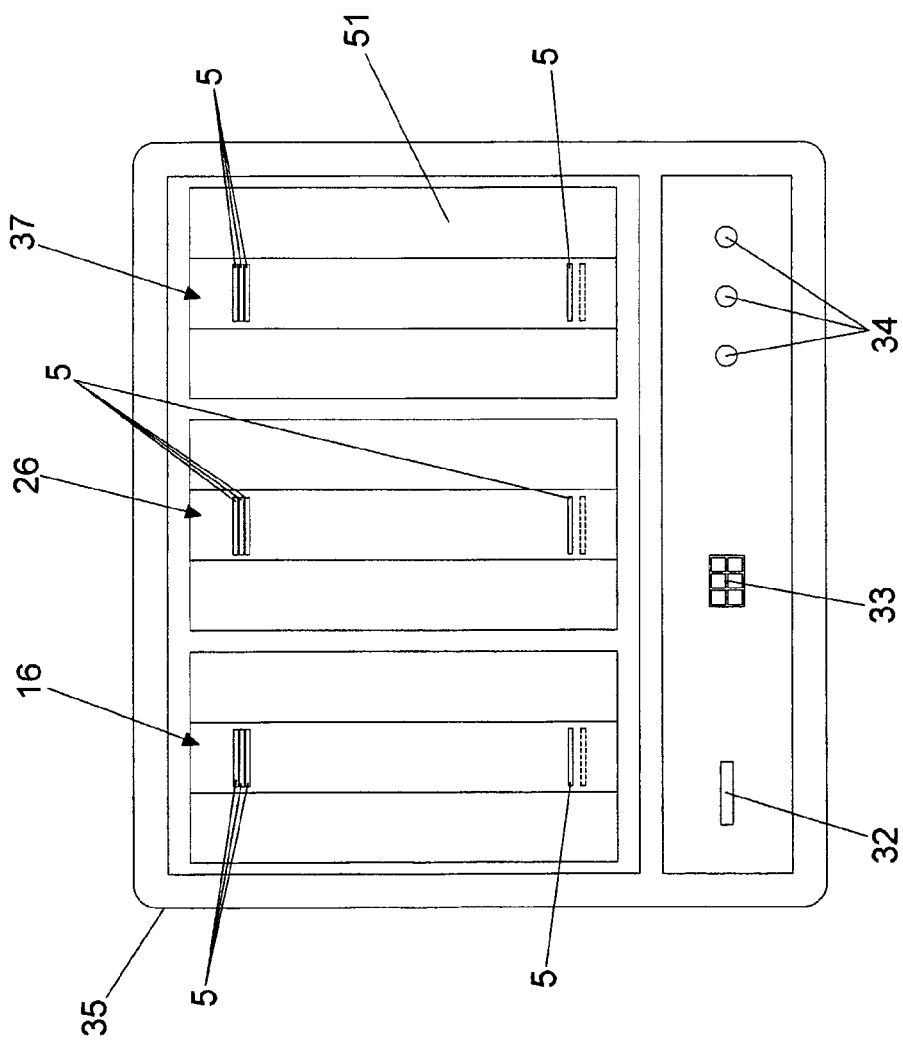

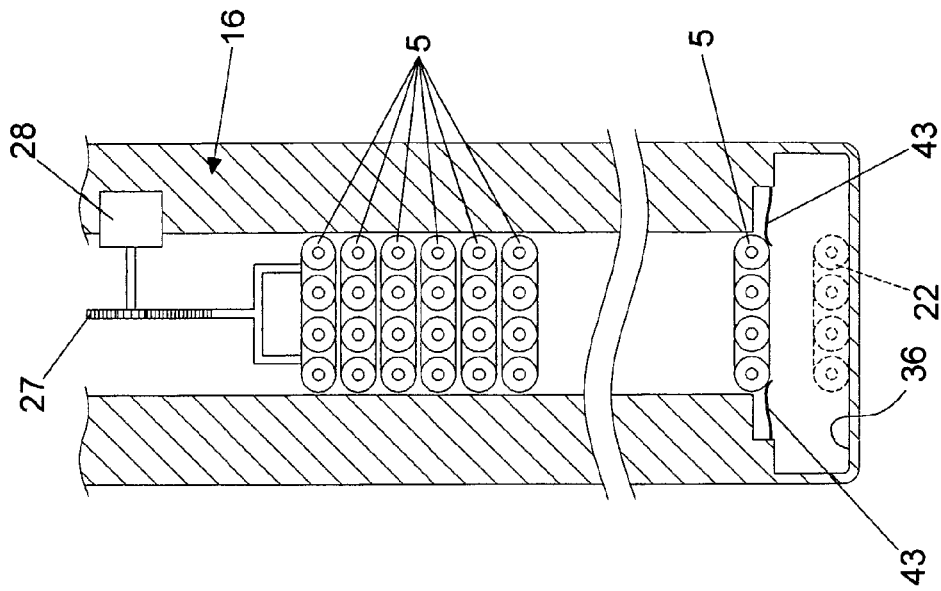
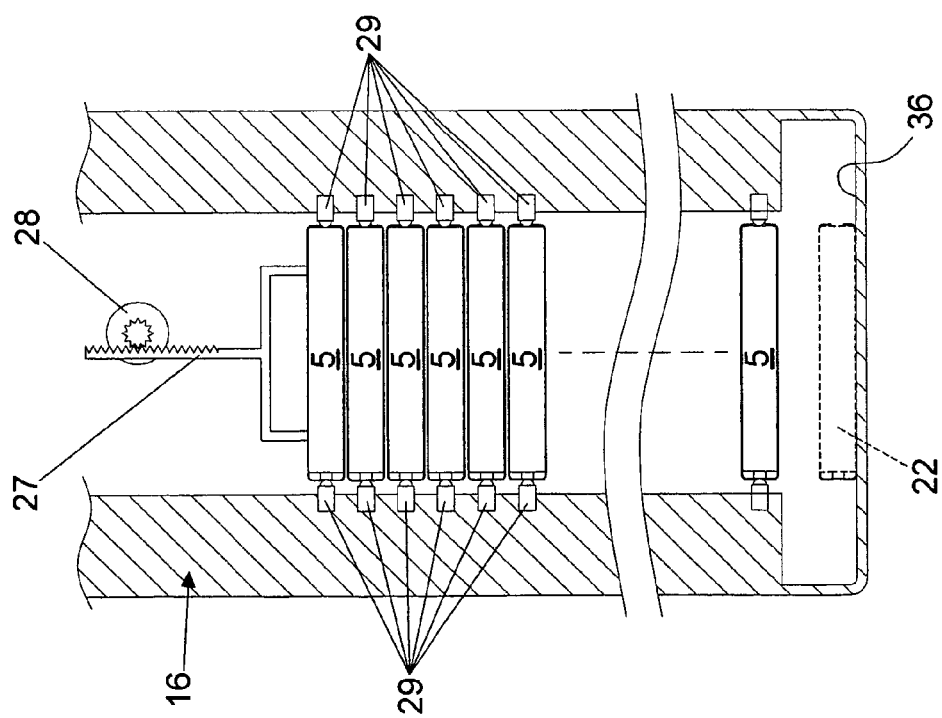

BATTERY-RECHARGING DEVICE

The present invention relates to a battery-recharging device.

More specifically, the invention relates to a re-charging device for rechargeable batteries, which can also be used as an exhibitor for blister-packaged battery packs (blister packaging).

It is known that rechargeable batteries have the disadvantage of being capable of preserving energy for relatively short periods of time.

The typical self-discharging time of an Ni—Cd or Ni—MH battery is in fact a few months and only rarely and under high storage temperature conditions does it reach 12 months.

Also considering the fact that the times necessary for the provisioning of batteries at the point of sale, in a modern goods distribution system, are becoming increasingly more limited, the final customer is almost always obliged to buy flat batteries and must therefore recharge them before use.

With respect to the requirements mentioned above and to overcome the limits specified, an objective of the present invention is to provide a rechargeable battery-charging device which allows the user to purchase fully charged batteries, to be able to check the charge degree and possibly recharge the above batteries directly at the sales point where the purchase is made, thus allowing charged batteries to be constantly available for the clients.

This is particularly useful in the case of the purchase of cellular telephones, radios, portable hifi plants, digital cameras and all consumer electronic equipment which can be currently purchased at sales points and used directly.

A further objective of the present invention is to provide a battery-recharging device which can also be directly used as an exhibitor of blister packaged battery-packs, at the sales point.

Another objective of the present invention is to provide a battery-recharging device which allows an easy handling of the charging and charge maintenance operations of batteries directly at the sales point.

Yet another objective of the invention is to provide a low-cost battery-recharging device, which allows electrical access to the of the packaged batteries, without having to open the blister packaging and thus enabling the sale of a "fresh" product to the client, with all the energy available right from the start.

A further objective of the invention is to provide a battery-recharging device which allows the supply of charged batteries, for use in places open to the public, so that the client can select and remove one or more of the blister packages.

Another objective of the invention is to indicate a battery-recharging device which is easy and economical to produce, without the use of complex or particularly costly technologies.

These and other objectives are achieved by providing a battery-recharging device for batteries (6), and for the display of battery packs (5) at a point of sale, said battery charging device comprising at least a supporting element (1, 17, 51), which includes a series of housings (2, 18) for the insertion and/or linking of battery packs (5) at a point of sale, and means (20, 30) for the charging, recharging and/or maintenance of the electric charge, electrically connected to said housings (2-18).

In a first embodiment of the invention, the charging device advantageously comprises a support which includes a series of seats or housings for the connection and linking of the battery packs on sale, a feeding wire (3) for connection to the power supply at 230 Volts, a base with the appropriate recharging circuits and a specific housing for the temporary resting a blister package of batteries whose charge level is to be checked.

In alternative embodiments of the recharging device, substantially consists of: a charger of rechargeable battery blister packages; a selector and automatic supplier of blister packages of charged batteries; an automatic payment system.

In this case, the blister packages are contained in a collecting device which comprises recharging circuits and automatic selection and supply means of the blister packages selected by the user, by means of a series of push buttons situated outside the recharging device.

This also enables the user to be completely autonomous as the device is also equipped with an automatic payment mechanism.

The collecting device can also be filled by the shopkeeper with blister packages of flat batteries and is capable of automatically charging the packaged batteries and supplying them, only after the charge has been controlled and effected.

Further characteristics and advantages of a battery-recharging device, according to the invention, will appear more evident from the following description and enclosed drawings, in which:

FIG. 1 schematically shows a front view of a first embodiment of a battery-recharging device, of the multiple type, according to the present invention, which cart also be used as an exhibitor, in sales points, of blister packaged battery packs;

FIG. 2 is a schematic front view of a blister package of batteries which can be used in the recharging device of the multiple type of FIG. 1, according to the present invention;

FIGS. 3 and 3A respectively show a front view and a perspective view of a blister packaging for batteries suitable for being used in a charge restoration and maintenance device, according to the present invention, which can be used for a first type of battery;

FIGS. 4 and 4A respectively show a front view and a perspective view of a battery packaging, according to the present invention, which can be used for a second type of battery;

FIGS. 5 and 5A respectively show a front view and a perspective view of a battery packaging, according to the present invention, which can be used for a third type of battery;

FIG. 13A shows a front view of a variant of the battery-recharging device according to FIGS. 11A and 11B, according to the present invention;

FIG. 13B is a side view of the battery-recharging device according to FIG. 13A;

Figure 16:
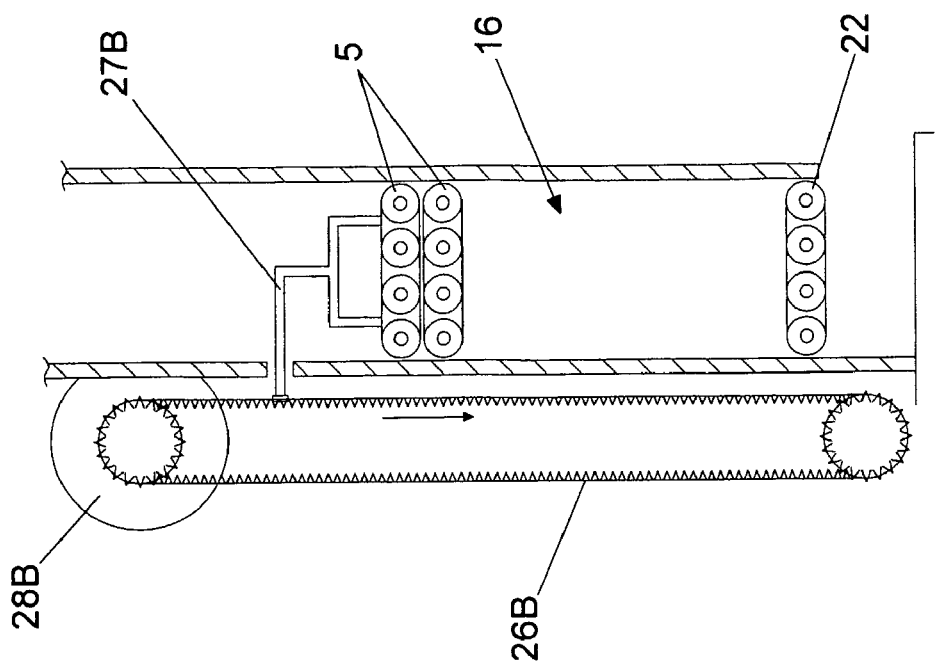
Figure 15:
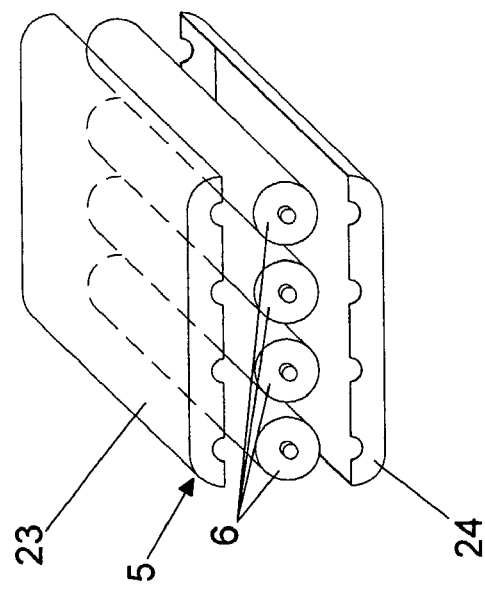

FIGS. 14A and 14B respectively show a front view and a side view of an enlarged detail of the recharging and supply mechanism of the blister packages present in the recharging device according to FIGS. 13A and 13B;

FIG. 15 shows an exploded perspective view of a further embodiment of a blister packaging of rechargeable batteries, which can be used inside the battery-recharging device according to FIGS. 13A and 133;

FIG. 16 shows a schematic sectional view of a technical solution which can be adopted in the battery-recharging device according to FIGS. 13A and 13B.

Figure 1:
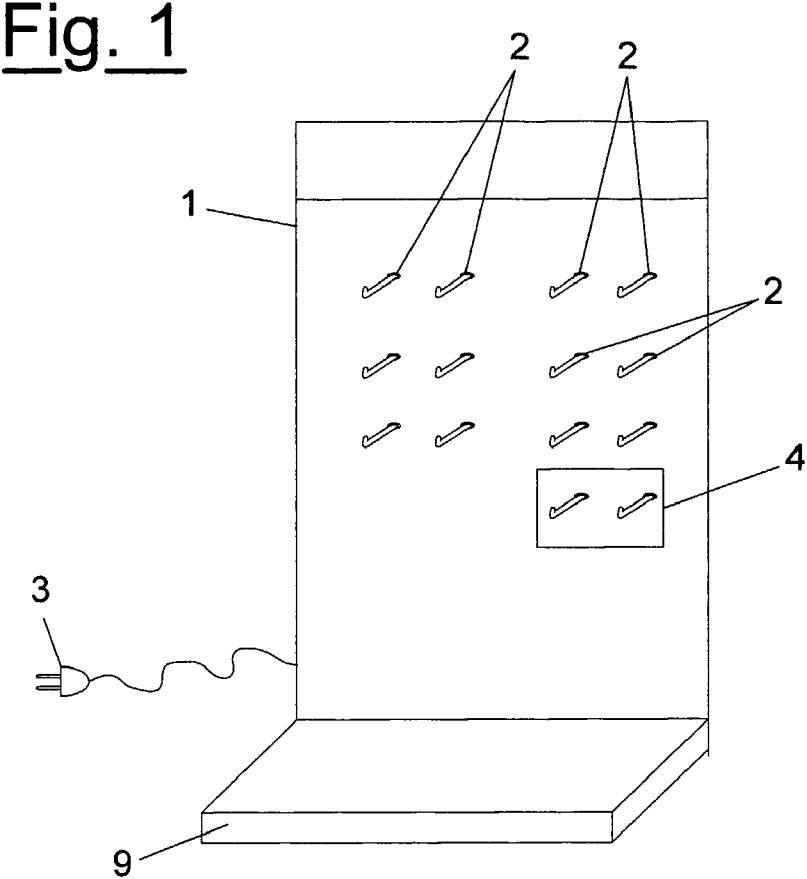
Figure 2:
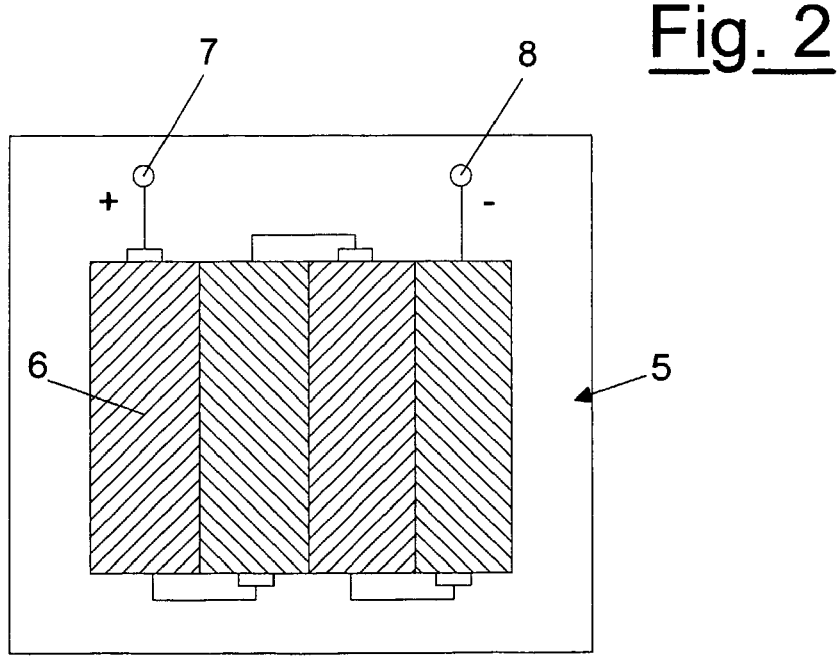

With particular reference to FIGS. 1 and 2, which represent a first preferred and illustrative embodiment, the battery-recharging device, which can also be used as a display element in various sales points, substantially comprises a front support 1, fitted with a rest base 9, which includes a series of seats or housings, indicated generically and as a whole with 2 (FIG. 1), for the connection and/or linking of battery packs 5 (FIG. 2), preferably blister packaged, which must be charged, kept charged and sold.

The recharging device also includes a feeding cable 3 for connection to the electric power supply at 230 Volts, whereas the rest base 9 comprises a series of suitable recharging circuits; there can also be an appropriate housing 4, which can be used for the temporary resting of a package or pack of batteries 5, whose charge level is to be checked.

The battery pack 5 is preferably produced in blister packaging for containing and grouping, for example, 4 Ni—MR batteries of the 2000 mAh "size AA" type and is constructed so as to allow it to be linked to one of the housings indicated with reference 2, which envisage connection to the specific charging and charge maintenance circuits contained in the base 9, in order to recharge and maintain the charge of the batteries 6 contained in the pack of batteries 5 until it is sold Each pack of batteries 5 is, on the other hand, constructed so that all the batteries 6 contained therein (for example 4 pieces for each pack of batteries 5, as illustrated in FIG. 2) are connected in series and only the two terminals 7, 8, positioned in correspondence with the first and last battery 6, are accessible for connection to the recharging device.

The terminals 7, 8 are situated inside each pack of batteries 5 for safety purposes, so that it is therefore impossible for them to be short-circuited by unintentionally resting the pack of batteries 5 on a metallic surface or putting them in a pocket, for example, in contact with a set of keys.

For this reason, the recharging device, which can also be used as an exhibitor at a point of sale, is produced so that each recharging housing 2 has a pair of respective terminals, suitable for being inserted in the terminals 7, 8 of the pack of batteries 5 for hanging it, recharging it and maintaining its charge level.

Furthermore, when the customer purchases the pack of batteries 5, after opening the blister packaging, the above batteries 6 can be freely used separately one from each other.

In practice, each housing 2 is connected to a section of a low-voltage charge circuit and, in turn, each charge circuit, by automatically recognizing the insertion of a pack of batteries 5, activates a charging cycle at the moment of insertion of the pack of batteries 5 on the front side 1 of the charging device. Each charging section is of the rapid charge type, i.e. capable of charging the pack of batteries 5 in about 1 hour; after this rapid charging period, the section automatically passes to a charge maintenance mode, by supplying a trickle charge current, in the order of ½₀ of the nominal charge current.

Each housing 2 can also have a LED signaling diode which indicates when the maximum charge level of the relative pack of batteries 5 has been reached, so that the salesman can know at any moment which pack of batteries 5 is ready for sale.

In this way, the salesman always has a certain number of packs of batteries 5 available each hour, which is equal to the number of recharging housings 2 present in the charger-exhibitor device.

If, for example, the charger-exhibitor device can house a number equal to fifty packs or blister packagings of batteries 6 for recharging, an average of, fifty charged packs of batteries 5 per hour for sale, will be available, as, as soon as a pack of batteries 5 has been sold, the salesman can immediately substitute it with a pack of flat batteries (which, in any case, will be ready in about 1 hour's time).

Alternatively, it is possible to produce a more economical model of the recharging device illustrated in FIG. 1, conceived for a smaller point of sale, wherein each charging section is not of the rapid charging type but has a maximum charge which can generally be reached in 12 hours In this case, the recharging device can be filled with packs of batteries 5 by the salesman the evening before the sale and the daily availability for sale will, at the least, be equal to the number of housings 2 envisaged on the front side 1 of the device.

As already specified, the recharging device and exhibitor can finally also comprise a special housing 4 for checking the charge level of each pack of batteries 5, In correspondence with this tester, three LED diodes (red, yellow and/or green-coloured) can also be present, which respectively indicate a low charge level, a medium charge level or a high charge level; in, this way, the salesman can, at any moment, check the unknown state of a pack of batteries 5 and the purchaser himself can check the charge level of each pack of batteries 5 of batteries 6 on sale.

With particular reference to FIGS. 3-10, the pack of batteries 5 of batteries 6 is illustrated in some of the possible embodiments, referring to the type of batteries most commonly used.

Figure 3:
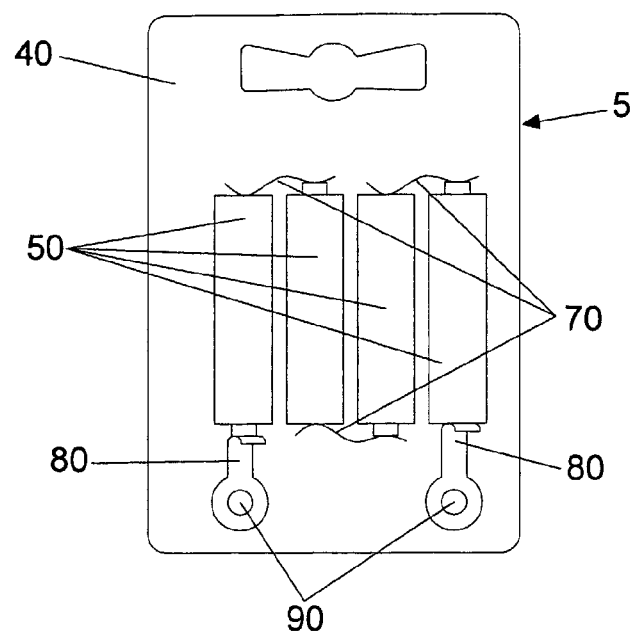
Figure 3A:
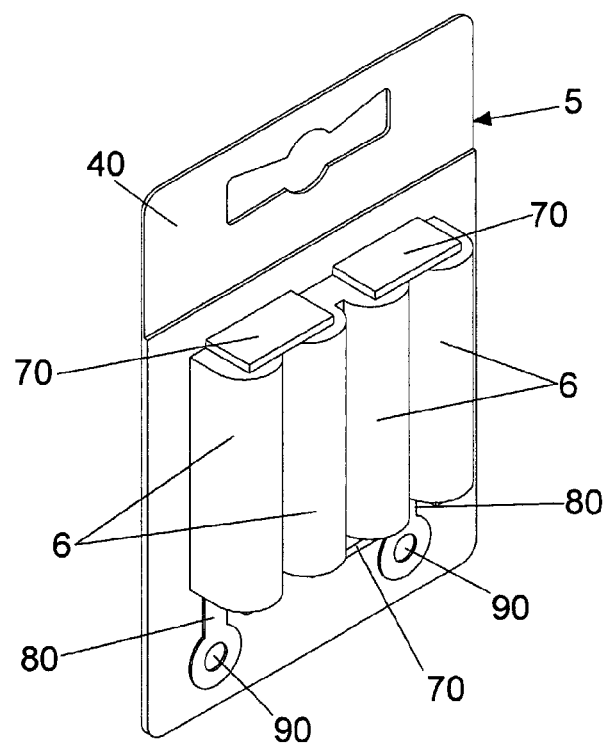
Figure 4:
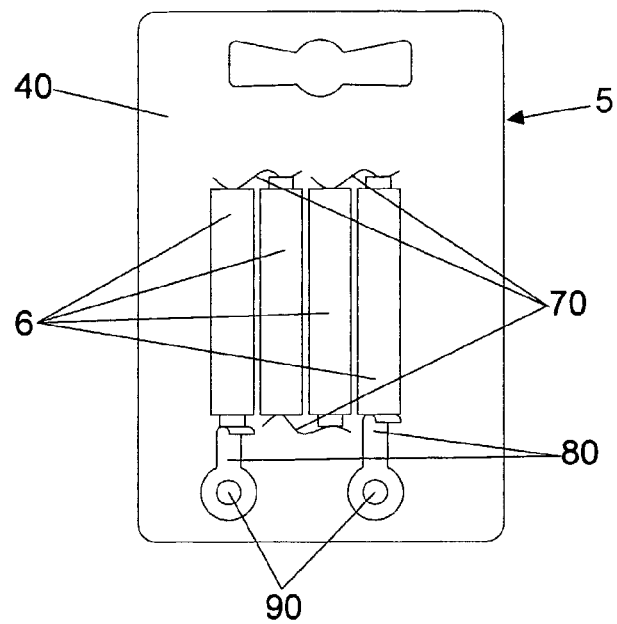
Figure 4A:
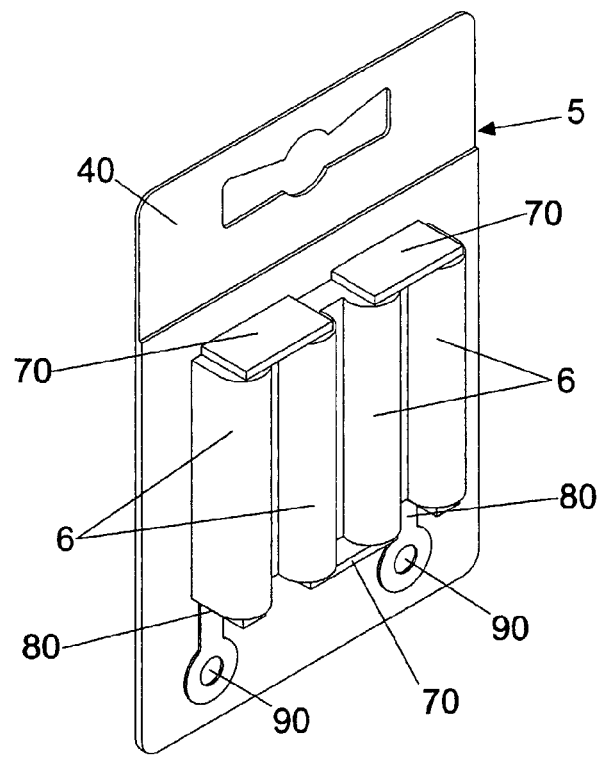
Figure 5:
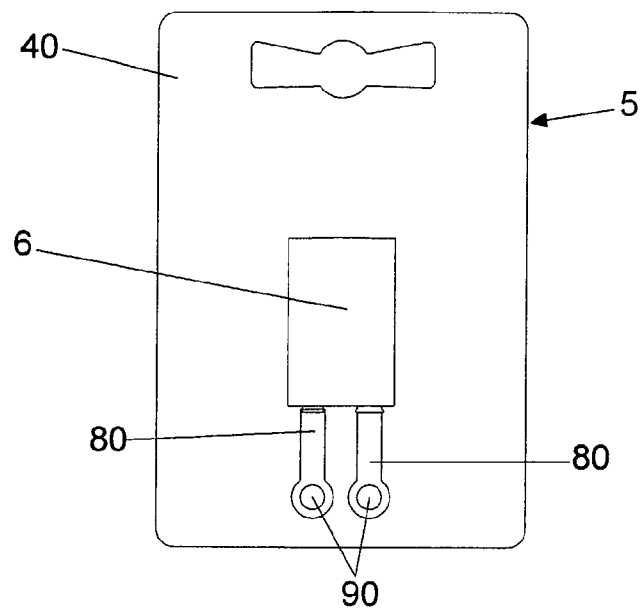
Figure 5A:
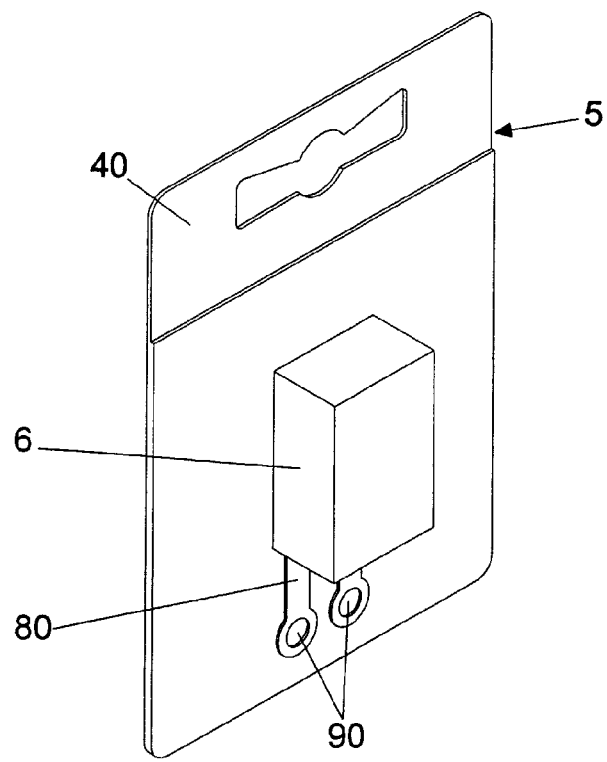

In particular, FIGS. 3 and 3A show a pack of batteries 5 comprising four 1.5 Volt batteries 6, of the AA type, FIGS. 4 and 4A show a pack of batteries comprising four 1.5 Volt batteries 6, of the AAA type, whereas FIGS. 5 and 5A show a pack of, batteries comprising a 6-9 Volt battery.

In any case, each pack of batteries 5 includes a printed card 40, on which the pack of batteries 6 are positioned, showing the indications of the manufacturer, the registration number of the batteries 6 themselves and the instructions for use.

The terminals of the batteries 6 are in contact with each other by means of metallic springs which form electric connections; the whole unit is wrapped in a transparent sheath or lining 60, normally made of a thermoplastic thermo-shrinkable material, which blocks all the elements and makes the whole unit solid.

in the particular case of batteries of the AA type (FIGS. 3 and 3A), the above batteries 6 are connected to each other in series by the springs 70, each of which connects a positive terminal of a battery 6 with the negative terminal of the adjacent battery 6.

The additional springs 80 contact the end terminals (positive pole and negative pole) of the series and makes them accessible on one of the wings of the card 40 of the blister packaging 5.

On this wing, in correspondence with the portion of springs 80 coplanar with the wing itself, there are two holes, indicated with 90, on the plastic thermo-shrinkable material.

In this way, by means of an appropriate electric contacting system, through the holes 90, it is possible to have access to the batteries 6 for its charging, recharging and maintenance operations.

The cases illustrated in FIGS. 4-4A and 5-5A, respectively, are completely analogous and differ only in, the particular type of battery 6 to be charged.

In particular, FIGS. 4 and 4A illustrate batteries of the AAA type, whereas FIGS. 5 and 5A show a battery consisting of a single 9 Volt element.

Figure 6:
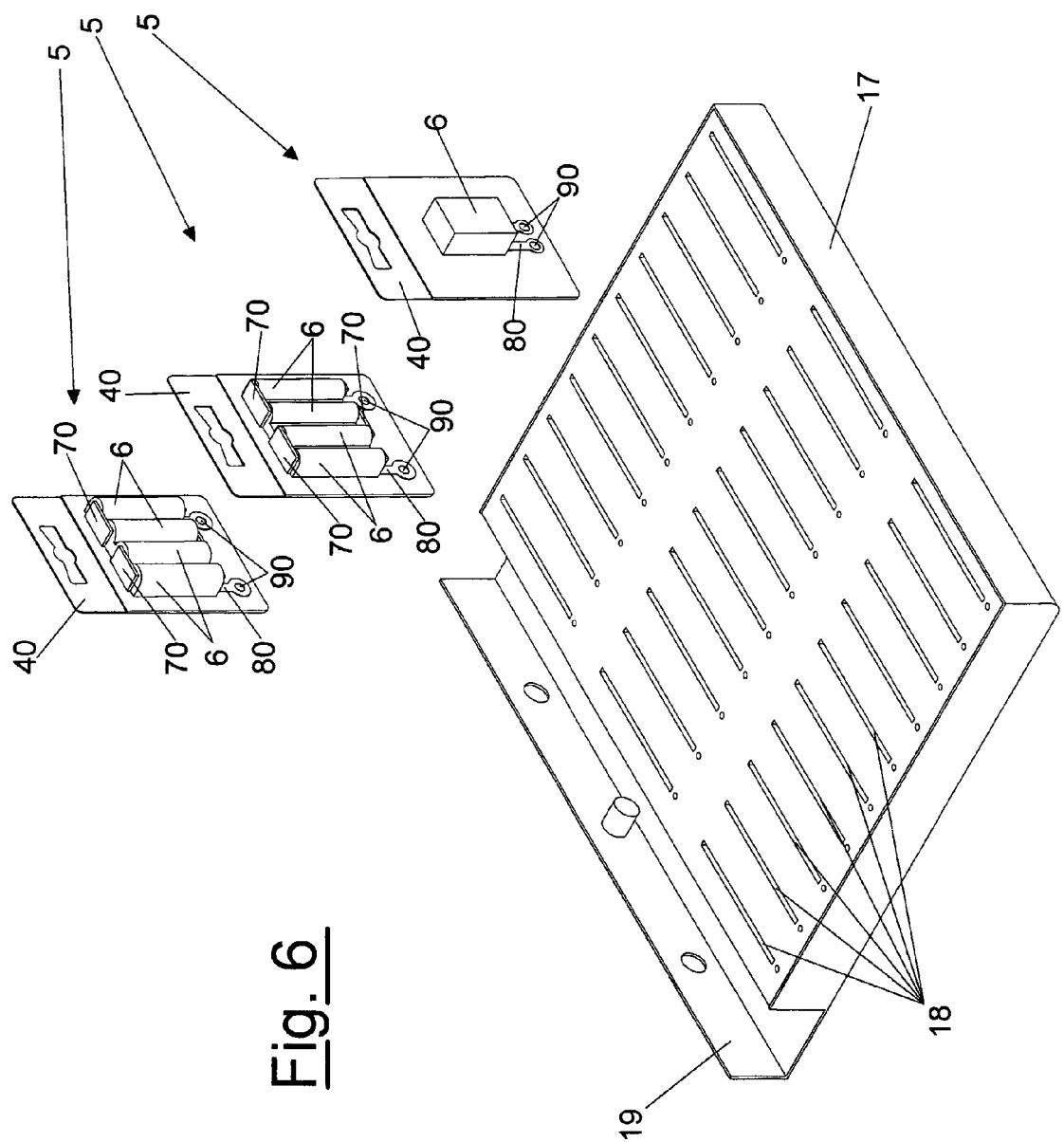
FIG. 6 shows a schematic and exploded perspective view of a second embodiment of the battery-recharging device, according to the present invention.

FIG. 6 shows an illustrative and preferred further embodiment of the recharging device for batteries, according to the invention, of the rapid connection and error-proof type.

More specifically, it is a flat charger 17, which can also have the accessory function of displaying the battery pack 5 (for example, inside a point of sale), having a series of slits 18, in which it is sufficient to insert the lower wing of each card 40 of the respective blister packaging 5.

The charger 17, in its single or multiple version, i.e. comprising a series of surfaces connected, by means of the bracket 19, to a vertical supporting structure, can also be advantageously used for display of the pack of batteries 5 at a point of sale, in order to allow there to be an ever-available supply of charged batteries for the client.

In each slit 18 of the charger 17, it is thus possible to indifferently insert one of the three types of packs of batteries 5, for 1.5 Volt of the AA or AAA type, or 9 Volt, as clearly shown in FIG. 6, which illustrates the various packs of batteries 5 in the insertion phase.

The slits 18 can have the same length of the lower wing of each pack of batteries 5 and all the packs of batteries 5 can have, in particular, the same length.

Figure 7:
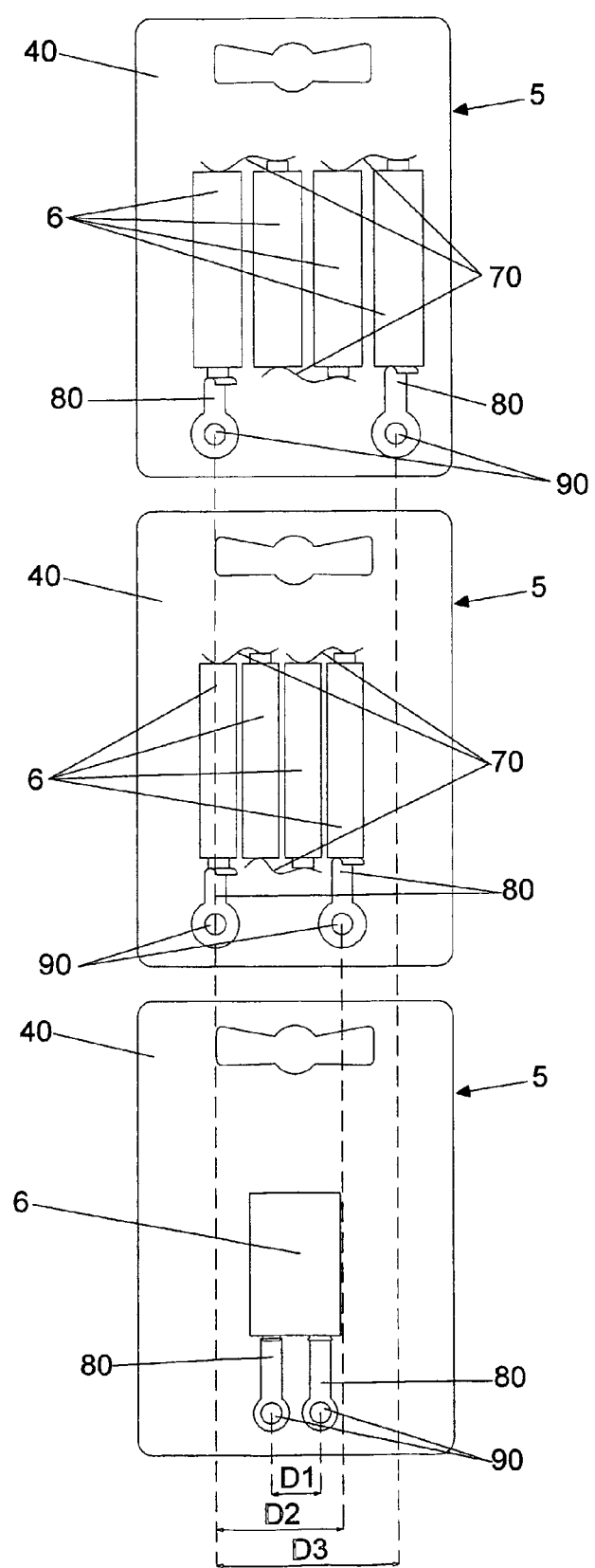
FIG. 7 shows a combination of the main types of blister packages and relative batteries used, indicating the contact phase displacement to allow the automatic selection of the type of battery when inserting the packaging in the recharging device of the invention.

As illustrated more clearly in FIG. 7, the three types of packs of batteries 5 are produced so that the outlet contacts, consisting of the springs 80, are suitably displaced in phase with each other in length (compare the distances indicated with D1, D2 and D3 in FIG. 7), in correspondence with the lower wing of the card 40.

In this way, the insertion of each pack of batteries 5 in the slit 18, in a forced position and determined by the length of the slit 18 itself, causes connection to the correct internal terminals of the charging device 17, thus allowing the necessary charge levels to be automatically selected for the particular type of battery 6 to be charged.

It is therefore possible to use a single charging device or charger 17 for recharging and maintenance in the main types of batteries 6 currently in use.

Figure 8:
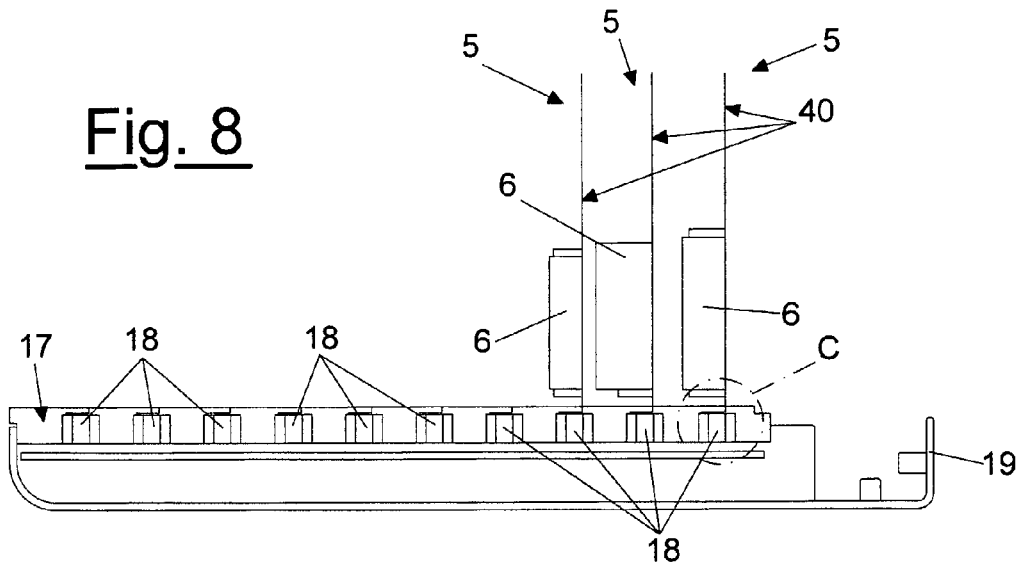
FIGS. 8, 8A and 8B illustrate in detail a first embodiment of the contact system which allows the electric connection between the recharging circuits and the contacts of the battery packages in the recharging device of FIG. 6, according to the present invention.
Figure 8A:
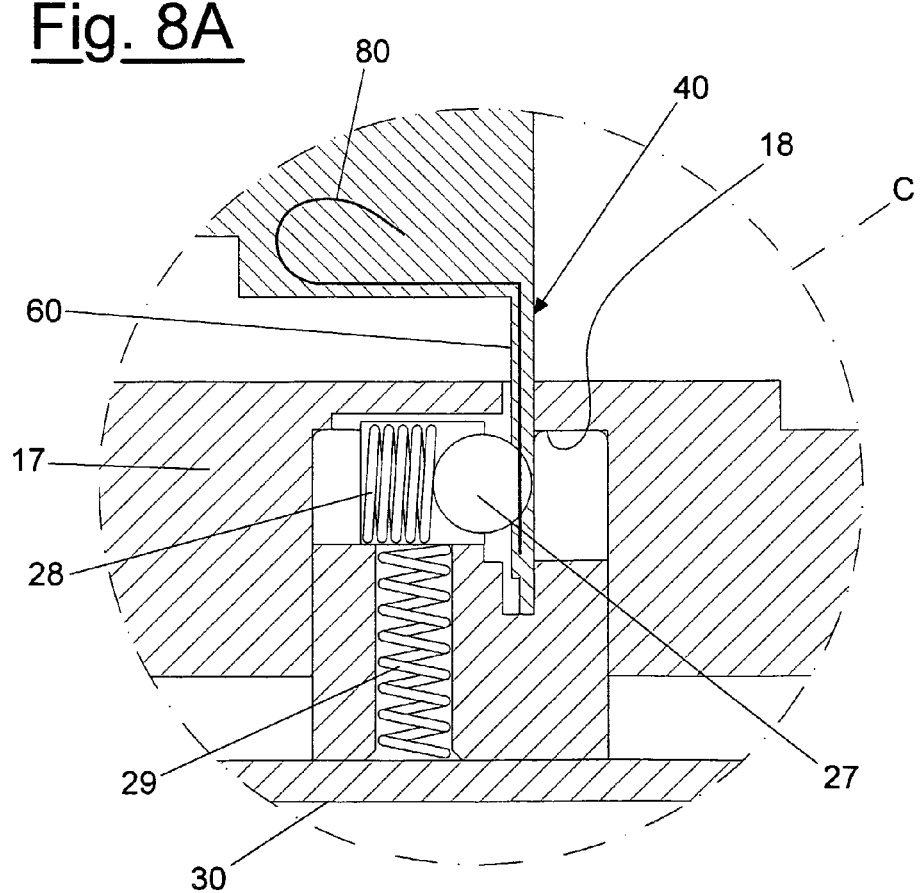
Figure 8B:
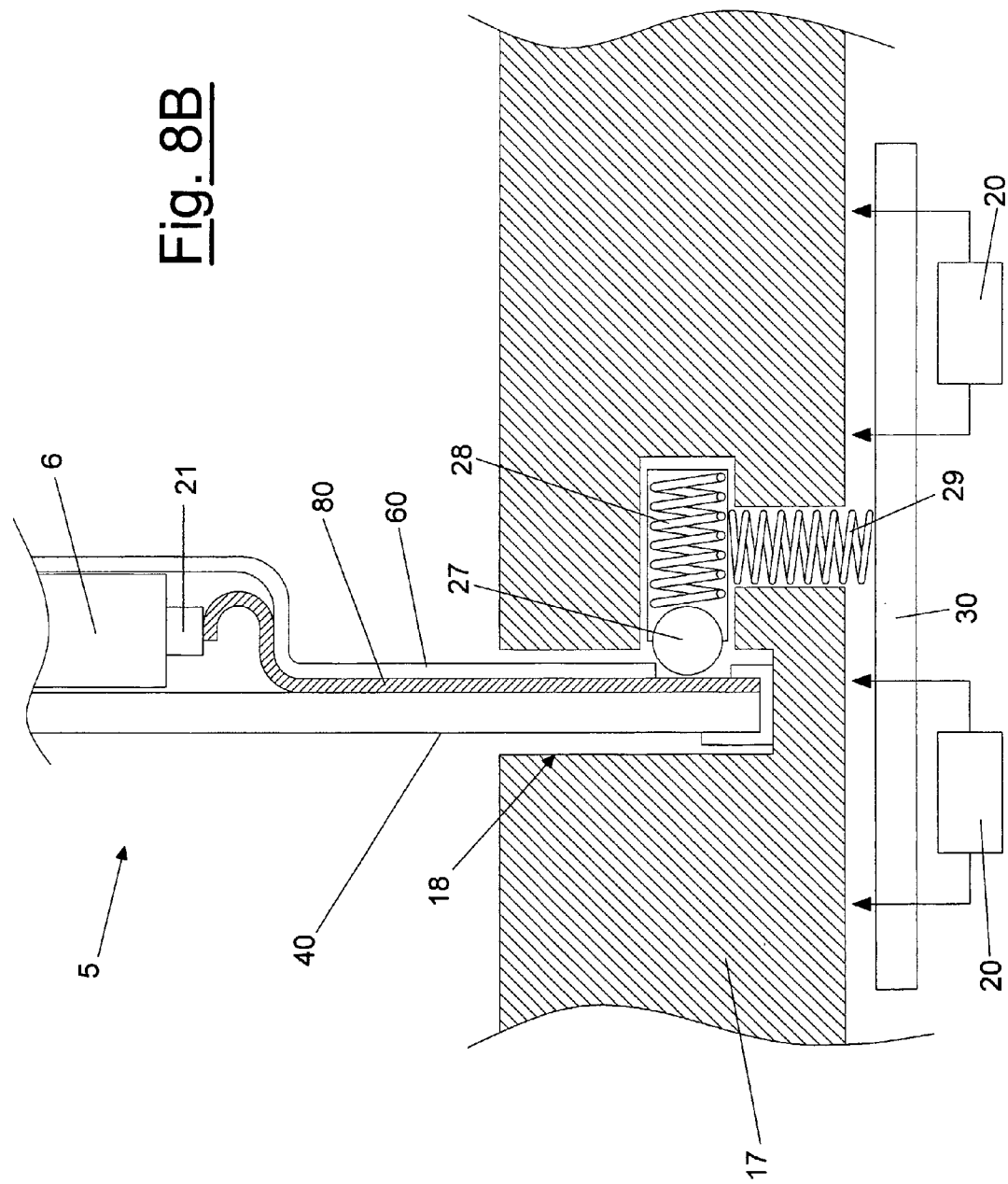

FIGS. 8, 8A and 8B show in detail a first embodiment of, the electric connection system of the pack of batteries 5 inside the slits 18 of the charger 17.

In particular, FIG. 8 shows a transversal section of the charging device 17 of FIG. 6, with each packaging 5 inserted in the respective slit 18, whereas FIG. 8A is an enlargement of the detail C of FIG. 8 and FIG. 88 is a sectional view with respect to FIG. 8A.

In this first embodiment, the electric contacting system envisages the use of metallic spheres pushed by springs, allowing a reliable electric connection between the outlets of the charging circuits and contacts of the pack of batteries 5.

The metallic sphere 27, pushed by the spring 28, ensures contact with the spring 80 incorporated in the pack of batteries 5, which guarantees contact with the positive or negative terminal 21 of the end battery of the series of 1.5 Volt batteries or 9 Volt single battery (depending on the type of batteries 6 being charged)

A further spring 29, used for constructive simplicity, forms the electric contact with the printed circuit 30 on which the electronic components 20 of the charger 17 are assembled.

This electric connection system combines the advantage of an excellent mechanical retention of the blister packaging 5, once inserted in the slit 18, thanks to a small step situated between the thermoplastic lining 60 of the packaging 5 and the metallic contact 80 (compare FIG. 8B for greater clarity), with that of obtaining a good self-cleaning electric contact, thanks to the scraping of the sphere 27 on the contact 80.

Figure 9:
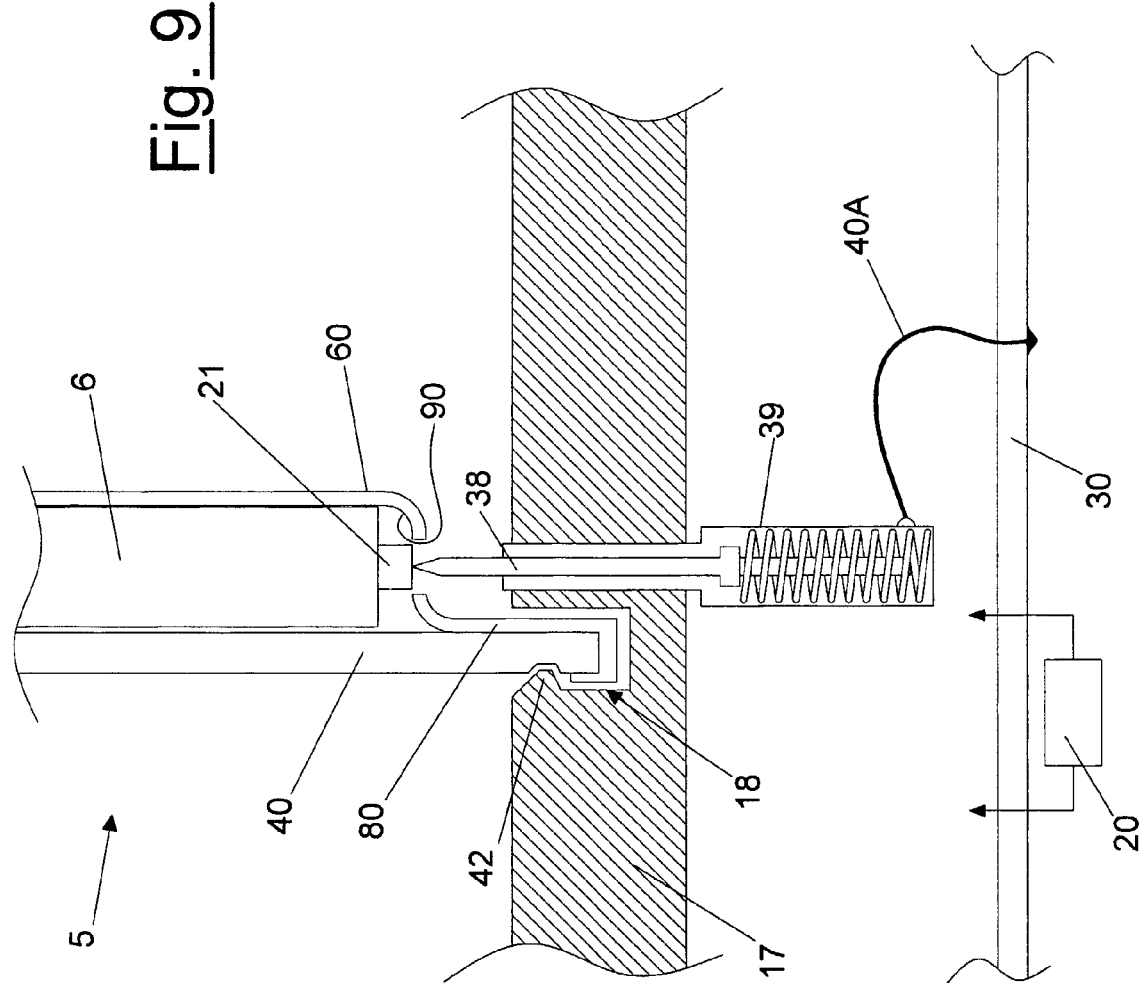
FIGS. 9 and 10 show other possible embodiments of the electric contacting system alternative to those illustrated in FIGS. 8, 8A and 8B, according to the invention.

FIG. 9 illustrates a second possible embodiment of the electric connection system between the pack of batteries 5 and the charging device 17.

In this case, the pack of batteries 5, which can be more conveniently used for 1.5 Volt batteries of the AA or AAA type, but also for 9 Volt batteries, may not have the spring contacts 80 and the holes 90 are situated in the transparent plastic lining 60, in correspondence with the electric terminals of the batteries 6.

As illustrated in FIG. 9, which refers to an electric contacting system for 1.5 Volt batteries of the AA or AAA type, the electric contact is obtained by means of a spring nail 38, which pushes on the electric terminal 21 of the battery 6, passing through the hole 90 situated on the thermoplastic lining 60.

The blister packaging 5 is also withheld by a notch 42, which is engaged with an incision on the card 40, at the rear of the packaging 5, whereas the jacket 39 of the spring nail 38 is connected, by means of the electric wire 40A, to the printed circuit 30 which houses the electronic components 20 of the charging device 17.

Figure 10:
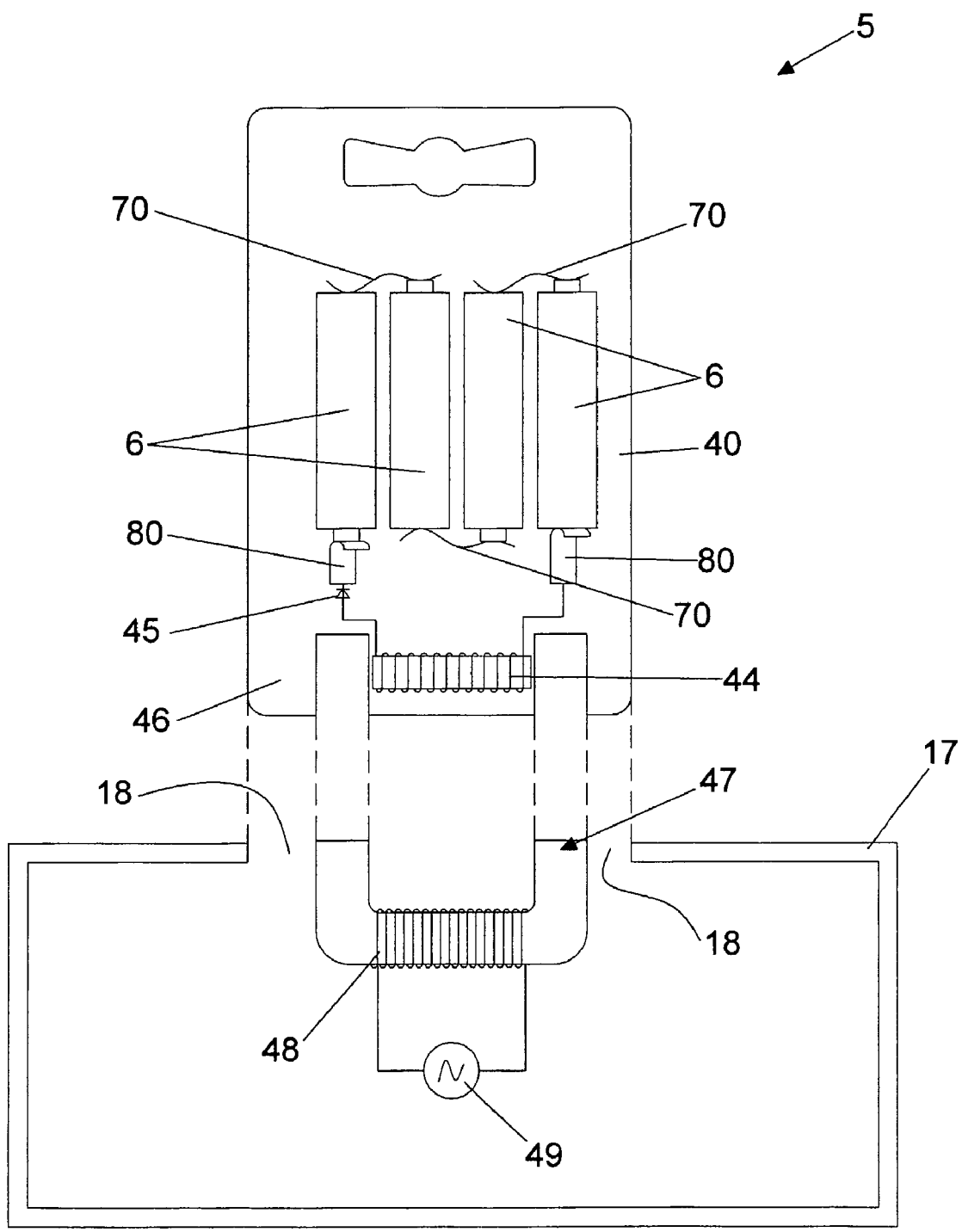

FIG. 10 illustrates a third possible electric connection system between the pack of batteries 5 and the charger-exhibitor device 17.

The pack of batteries 5 (in the case illustrated as an example in FIG. 10, this is a pack of batteries 5 containing four 1.5 Volt batteries 6 of the AA type, which have a lower spring contact 80) incorporates, according to this embodiment, a small inductor 44, for example with a ferrite nucleus, and a rectifier diode 45.

The blister packaging is also equipped with suitable guiding wings 46 for the inserting of the charging device 17, in which there are suitable slits 18, in this case equipped with guides.

Furthermore, a C-shaped magnetic circuit 47 with, polar expansions, on which the coiling 48 is wound, is housed in the charging device 17.

When the pack of batteries 5 is inserted in the slits or housings 18, the inductor 44 is inserted between the inductive magnetic coupling between the inductor 44 and the coiling 48.

In this way, the electric energy supplied by the alternating current generator 49 is transferred to the circuit of the pack of batteries 5, by means of the inductor 44, and the above electric energy, suitably rectified by the diode 45, charges the batteries 6.

FIG. 10 shows an illustration of a blister packaging 5, containing four batteries 6 of the AA type, but it can also completely analogously show the pack of batteries 5 for the other battery models.

In these cases, the appropriate charge current is dimensioned by varying the number of coils of the inductor 44, different for each different type of battery 6.

In this way, the charging device 17, with its electrical elements 47, 48, 49, remains the same, universal, and can also be used with the other electric contacting systems described and for all the packs of batteries 5, and does not require any expedient for determining which type of battery 6 is being used at a certain moment, as the pack of batteries 5 itself is dimensioned to remove the necessary energy from the charger-exhibitor device 17.

Figure 11B:
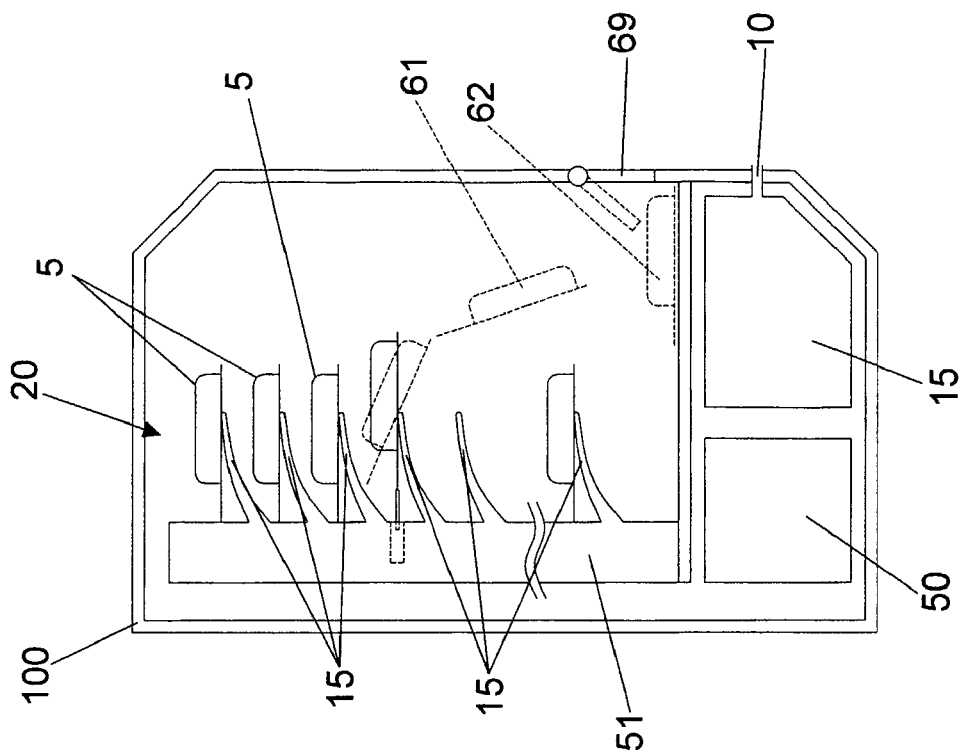
FIG. 11B is a side view of the recharging device according to FIG. 11A.
Figure 11A:
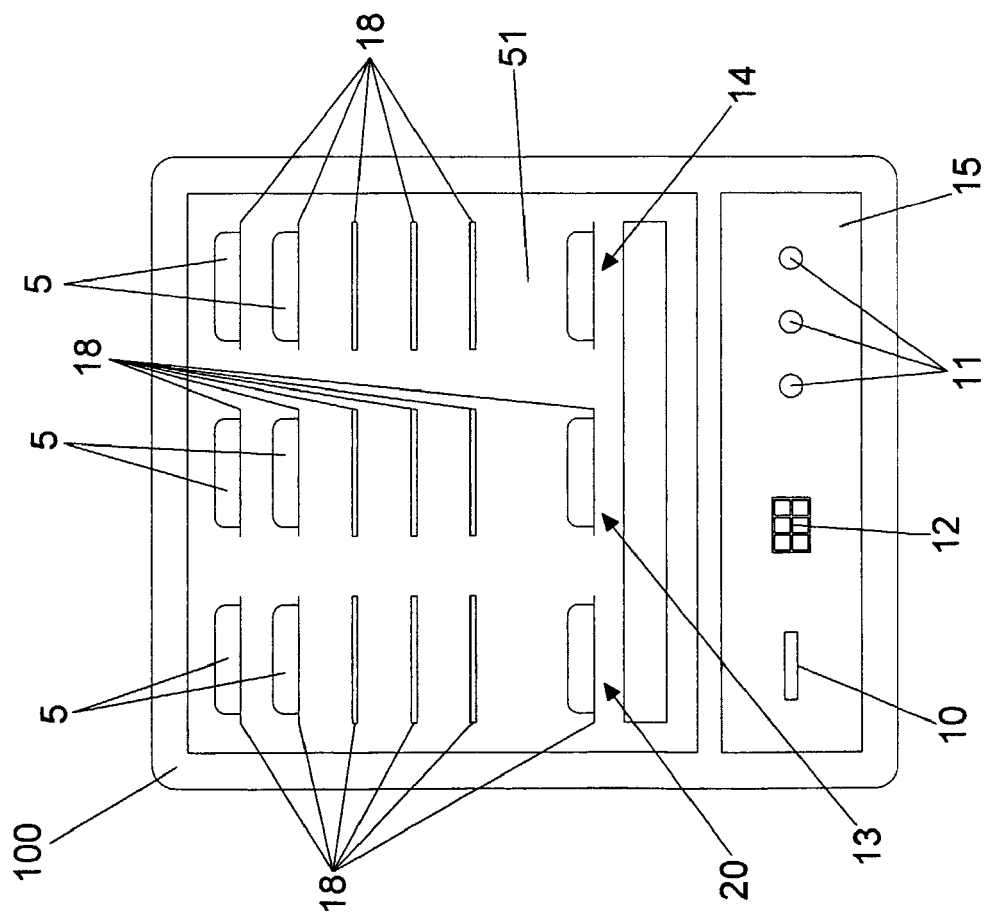
FIG. 11A shows a front view of a third embodiment of a blister packaged battery-recharging device, also suitable for the automatic distribution of the packages, according to the present invention.
Figure 12:
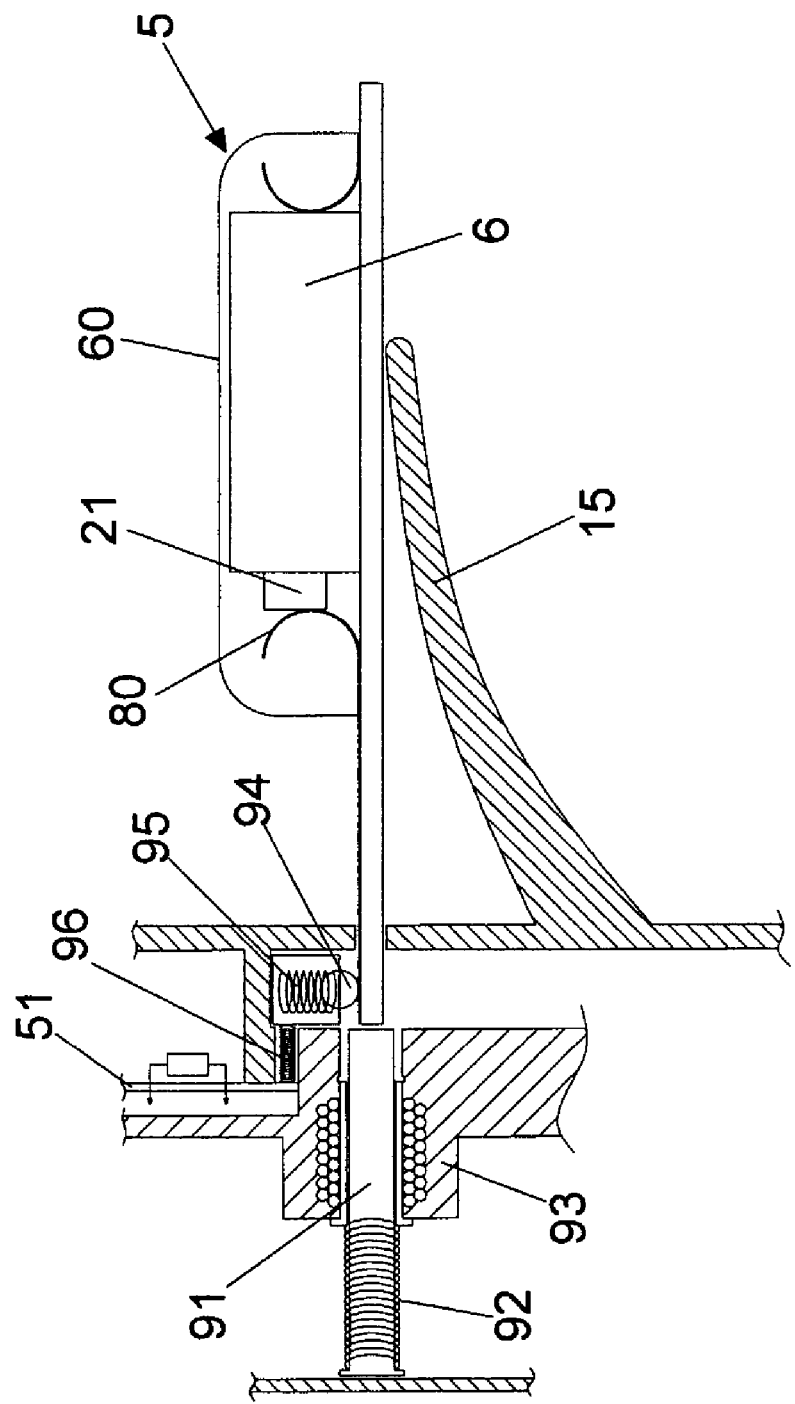
FIG. 12 shows an enlarged sectional detail of a charging and expulsion device (supply) of each blister package of batteries, present in the battery-recharging device according to FIGS. 11A and 11B, according to the invention.

FIGS. 11A, 11D and 12 refer to a further possible solution of the battery recharging device, object of the present invention. The pack of batteries 5 are inserted in a collector panel 51, which includes the charging device 17 of the batteries 6 and a series of mechanisms for the automatic expulsion of the pack of batteries 5 to be supplied, after being appropriately selected by the users.

The whole unit is enclosed in an outer safety casing 100, which contains the collector panel 51, a payment device 15 and an electronic panel 50, which controls the selection and supply of each blister packaging 5, once the batteries 6 have been charged.

The payment device 15 includes a slit 10 for the introduction of the coins, a display device 12 for counting the coins inserted and three push-buttons 11 for the selection of the desired blister packaging 5, with respect to the type of battery 6; in this respect, batteries of the AA, AAA or 9 Volt type are preferably available.

The collector panel 51 is in fact organized so as to be able to contain three packs of batteries 5 in columns, indicated with 20, 13 and 14 respectively in FIG. 11A, each of which can indifferently contain rechargeable batteries 6 of the AA, AAA and/or 9 Volt type.

The packs of batteries 5 are introduced into the appropriate recharging slits 18 of the collector panel 51 and kept in a horizontal position by means of shelves 15.

Each slit 54 can contain a pack of batteries 5 containing any of the types of rechargeable batteries (AA, AAA, 9 Volt), as the charging device 17 of the batteries 6 automatically recognizes the type of a pack of batteries 5 inserted. In this way, the salesman is further advantaged as he does not have to pay any particular attention during the filling operation of the charging device.

In order to remove a pack of batteries 5 containing the desired type of battery 6, the coins must be inserted in the slit 10 of the payment device 15; this operation facilitates the selection push-buttons 11 of the blister packaging 5, which is positioned in a respective column 20, 13 or 14 of the collector panel 51.

When a user selects a pack of batteries 5 of the column 20, 13 or 14, by pressing one of the buttons 11, a logic is activated, which selects the pack of batteries 5 containing the most highly-charged batteries 6 among those preselected and activates the expeller associated therewith, by dropping the packaging itself onto the lower inside surface (positions indicated with 61 and 62 in FIG. 11B), from which it can be removed by opening the window 69.

FIG. 12 illustrates in detail, the expulsion and contacting device for recharging the batteries 6 contained inside the thermo-shrinkable plastic lining 60 of the pack of batteries 5.

In particular, in FIG. 12, the pin 91 of the expeller is shown in a rest position, in which it is maintained by the spring 92.

When an electric current suitably polarized to the coiling 93, is applied, an entrainment force of the pin 91 and compression of the spring 92 is triggered, which produces the expulsion of the blister packaging 5 towards the right and its consequent falling onto the collection surface situated below the panel 51.

By interrupting the electric current flow, the spring 92 brings the pin 91 back into the rest position, allowing a new pack of batteries 5 to be inserted.

The stainless steel sphere 94, associated with the spring 95, electrically contacts the terminal 80 of the pack of batteries 5 for the charging of the batteries 6 contained therein, when the pack of batteries 5 is in a recharging position; in this way, the electric connection with the circuit of the charging device 17 is effected by means of the spring 96.

The filling of the collector panel 51 takes place from the front window, which, upon opening, makes the recharging slits 18 accessible and allows the introduction of the pack of batteries 5 in the various charging positions.

FIGS. 13A, 13B, 14A, 14B, 15 and 16 illustrate a further variant of the battery recharging device, object of the invention.

This technical solution uses a blister packaging configuration such as that illustrated in FIG. 15; in particular, FIG. 15 shows a pack of batteries 5 containing rechargeable batteries 6 of the AA type, analogous solutions are possible, however, for geometries of rechargeable batteries of the AAA and 9 Volt type, not shown.

In this case, the blister packaging is produced with two symmetrical shells 23, 24 which mechanically hold the batteries 6, leaving the eight terminals free; in this type of packaging, each battery 6 can be charged individually.

With particular reference to FIGS. 13A and 13B, the battery recharging device according to the invention comprises three columns 16, 26, 37, contained inside an outer casing 35, each of which contains a different type of blister packaging.

In correspondence with each column 16, 26, 37, the blister packages are stacked on top of each other, on the horizontal side of the packaging, as better shown in FIGS. 14A, 14B; these FIGS. 14A, 14B also illustrate the sphere contacts and spring 29 for the charging of the batteries 6.

The payment device for the blister packages governed by the control logic 31, is analogous to that described above, and the slit 32 for the insertion of the coins, the visualization display panel 33 and the selection push-buttons 34 are used in particular.

The expulsion command for the blister packaging 5 occurs, after payment has been effected, by pressing one of the push-buttons 34 and the consequent activation of the motor 28 (illustrated in detail, with reference to column 16, in FIGS. 14A and 14B).

The rotation of the motor 28 produces the downward advancing of the rack pusher 27 having a definite run, equal to the thickness of the blister packaging, thus forcing the springs 43 to release the packaging situated below, causing it to, fall onto the collection surface 36 (position generically indicated with 22 in FIGS. 13B, 14A and 14B), situated in correspondence with the window 41.

Contemporaneously, all the stack of blister packages placed above will move by a position towards the lower surface and consequently each package will receive feeding from the sphere contacts 29 of the underlying surface, keeping the charge active.

Each column 16, 26, 37 contains, in correspondence with the spring contacts 29, the charge circuits (not shown in the figures) which, suitably connected electrically to the springs 29, maintain the electric charge inside the batteries 6.

The filling of each column 16, 26, 37 takes place from a front window of the casing 35, which, upon opening, makes the three columns 16, 26, 37 accessible and allows the introduction of the respective packages in the various charging positions.

Finally, an expelling device of the blister packaging, alternative to that described above, is illustrated in FIG. 16.

In practice, a pusher 27B is used, which can be conveniently moved with a belt 26B, activated, in turn, by the motor 28B, so as to reduce the vertical hindrance of the rod or rack 27 used in the version according to FIGS. 14A and 14B.

The characteristics, as also the advantages, of the battery recharging device, object of the present invention, are evident from the above description.

Finally, numerous other variants can obviously be applied to the battery recharging device in question, all included in the novelty principles inherent to the inventive idea. It is also evident that, in the practical embodiment of the invention, the materials, forms and dimensions of the details illustrated can, vary according to requirements and can be substituted with other equivalent alternatives.

The invention claimed is:

1. A battery recharging device for batteries (6), and for the display of battery packs (5) at a point of sale, said battery charging device comprising at least a supporting element (1, 17, 51), which includes a series of housings (2, 18) for the insertion and/or linking of, battery packs (5) at a point of sale, and means (20, 30) for the charging, recharging and/or maintenance of the electric charge, electrically connected to said housings (2, 18) wherein each pack of batteries (5) contains batteries (6), connected in series to each other, of which at least two terminals (7, 8, 80) are accessible from the outside of the pack of batteries (5) for connection to the recharging and/or maintenance means (20, 30) of an electric charger, wherein said at least one supporting element (1, 17, 51) comprises automatic selection and supply means of at least one of said battery packs (5), driven by an electronic panel (50), when a selection is effected by a user by means (10, 11, 12, 32, 33, 34) situated on the outer casing (35) of the recharging device wherein said at least one supporting element (1, 17, 51) includes a series of columns (13, 14, 16, 20, 26, 37), inside which the battery packs (5) are introduced into appropriate slits (18) and kept in a horizontal position by means of shelves (15), wherein said electronic panel (50) selects at least one battery pack (5) containing the most highly charged batteries (6) of the type selected.

2. The battery recharging device according to claim 1, characterized in that it also comprises at least one suitable housing (4) for checking the charge level of battery packs (5), said suitable housing (4) being adapted to be used for the temporary support of one of said battery packs (5), whose charge level is to be checked.

3. The battery recharging device according to claim 1, characterized in that each of said housings (2, 18) comprises signaling means, suitable for indicating the charge level and/or the arrival at the maximum charge level of the battery pack (5) that is inserted.

4. The battery recharging device according to claim 1, characterized in that said two terminals (7, 8, 80) are situated at different distances, in order to be able to automatically select the necessary charge levels for the various types of batteries (6) to be charged.

5. The battery recharging device according to claim 1, characterized in that said at least one supporting element (1, 17, 51) comprises, in correspondence with each seat or housing (2, 18), at least one metallic body (27), pushed by at least a first elastic conductor element (28), which ensures electric contact with said at least two terminals (7, 8, 80) of the battery pack (5), whereas at least a second conductor element (29) produces the electric contact with said recharging means of the electric charger.

6. The battery recharging device according to claim 1, characterized in that at least one of said terminals (7, 8, 80) contacts at least one spring nail (38), in turn electrically connected to said recharging means (20, 30) of the electric charger.

7. The battery recharging device according to claim 6, characterized in that said battery pack (5) is held in position by a notch (42) of said at least one supporting element (1, 17, 51), which is engaged with an incision situated on the packaging (5).

8. The battery recharging device according to claim 1, characterized in that said battery pack (5) has at least one guiding wing (46) for insertion inside said housings (2, 18) and is also equipped with at least one inductor element (44) and/or at least one rectifier diode (45), said at least one supporting element (1, 17, 51) comprising at least one magnetic circuit (47), with polar expansions, on which at least one coil (48) is wound, so that, upon insertion of the battery pack (5) in the respective housing (2, 1.8), said inductor element (44), inserted between said polar expansions of the magnetic circuit (47), forms an inductive magnetic coupling with said coiling (48), so as to transfer the electric energy, supplied by an alternating current generator (49) and rectified by said diode (45), to the batteries (6) of the battery pack (5).

9. The battery recharging device according to claim 1, characterized in that said automatic selection and supply means comprise at least one pin (91) of an expeller, kept in rest position by at least a first elastic element (92), and at least one coil, which, after the passage of an electric current, generates an entrainment force on said pin (91) of the compression of said first elastic element (92), which produces the expulsion of the battery pack (5) and the falling of said battery pack (5) onto a collection surface (36).

10. The battery recharging device according to claim 9, characterized in that said at least one supporting element (1, 17, 51) is electrically connected, by means of at least a second elastic element (96), with a body (94), associated with at least a third elastic element (95) and suitable for contacting at least one terminal (80) of the battery pack (5) for the charging of the batteries (6) contained therein.

11. The battery recharging device according to claim 1, characterized in that said battery pack (5) is made up of two symmetrical shells (23, 24) which mechanically withhold the batteries (6) and leave the relative terminals free, so that each battery (6) can be charged individually.

12. The battery recharging device according to claim 1, characterized in that said battery packs (5) are stacked on top of each other, in correspondence with each column (13, 14, 20, 16, 26, 37).

13. The battery recharging device according to claim 1, characterized in that said automatic selection and supply means comprise at least one motor (28), whose rotation produces the moving of at least one pushing element (27) which causes the release of each battery pack (5) from the withholding elastic elements (29, 43).

14. The battery recharging device according to claim 1, characterized in that said automatic selection and expulsion means comprise at least one pushing element (278), moved by at least one belt (268), in turn activated by at least one motor (288).

15. A battery recharging device for batteries (6), and for the display of battery packs (5) at a point of sale, said battery charging device comprising at least a supporting element (1, 17, 51), which includes a series of housings (2, 18) for the insertion and/or linking of battery packs (5) at a point of sale, and means (20, 30) for the charging, recharging and/or maintenance of the electric charge, electrically connected to said housings (2, 18) wherein each pack of batteries (5) of batteries (6) contains batteries, connected in series to each other, of which at least two terminals (7, 8, 80) are accessible from the outside of the pack of batteries (5) for connection to the recharging and/or maintenance means (20, 30) of an electric charger, wherein said at least one supporting element (1, 17, 51) comprises automatic selection and supply means of at least one of said battery packs (5), driven by an electronic panel (50), when a selection is effected by a user by means (10, 11, 12, 32, 33, 34) situated on the outer casing (35) of the recharging device wherein said at least one supporting element (1, 17, 51) includes a series of columns (13, 14, 16, 20, 26, 37), inside which the battery packs (5) are introduced into appropriate slits (18) and kept in a horizontal position by means of shelves (15), and wherein said electronic panel (50) selects at least one battery pack (5) containing the most highly charged batteries (6) of the type selected wherein said battery pack (5) is made up of two symmetrical shells (23, 24) which mechanically withhold the batteries (6) and leave the relative terminals free, so that each battery (6) can be charged individually and wherein said battery packs (5) are stacked on top of each other, in correspondence with each column (13, 14, 20, 16, 26, 37) and wherein said automatic selection and supply means comprise at least one motor (28), whose rotation produces the moving of at least one pushing element (27) which causes the release of each battery pack (5) from the withholding elastic elements (29, 43) and said automatic selection and expulsion means comprise at least one pushing element (27B), moved by at least one belt (26B), in turn activated by at least one motor (28B).

\* \* \* \* \*